United States Patent [19]
Smith

[11] 3,942,772
[45] Mar. 9, 1976

[54] TECHNIQUE FOR MIXING GRANULAR MATERIALS
[75] Inventor: Carl K. Smith, Mathis, Tex.
[73] Assignee: Mid-Continent Pipeline Equipment Company, Houston, Tex.
[22] Filed: Apr. 5, 1974
[21] Appl. No.: 458,304

[52] U.S. Cl. .................... 259/148; 259/2; 259/165
[51] Int. Cl.² .......................................... B28C 1/16
[58] Field of Search .......... 259/161, 148, 149, 165, 259/180, 150, 2, 162, 164, 153, 145, 146, 11, 28

[56] References Cited
UNITED STATES PATENTS

| | | | |
|---|---|---|---|
| 1,622,294 | 3/1927 | Saulnier | 259/165 |
| 2,533,852 | 12/1950 | Tietig | 259/165 |
| 3,182,973 | 5/1965 | Sluis | 259/148 |
| 3,536,303 | 10/1970 | Johanson | 259/180 |

Primary Examiner—Robert W. Jenkins
Attorney, Agent, or Firm—G. Turner Moller

[57] ABSTRACT

There is disclosed a technique for mixing concrete in which cement and aggregate are separately discharged from metering devices in free fall paths of precise predetermined cross-section toward a conveyor. The material paths converge toward a rotating mixing device positioned above the conveyor which intermingles the materials before they reach the conveyor. The conveyor includes an air supported endless belt equipped with adjustable wear strips for engaging the belt and limiting movement thereof away from the air support system. Means are provided to prevent belt damage caused by a prong of a mixing device binding a piece of aggregate against the belt.

29 Claims, 15 Drawing Figures

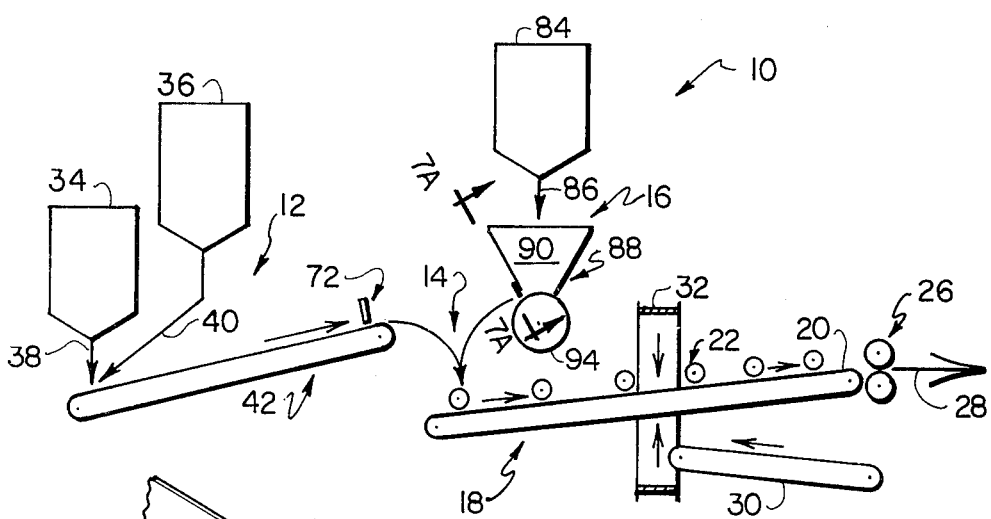
FIG. 1
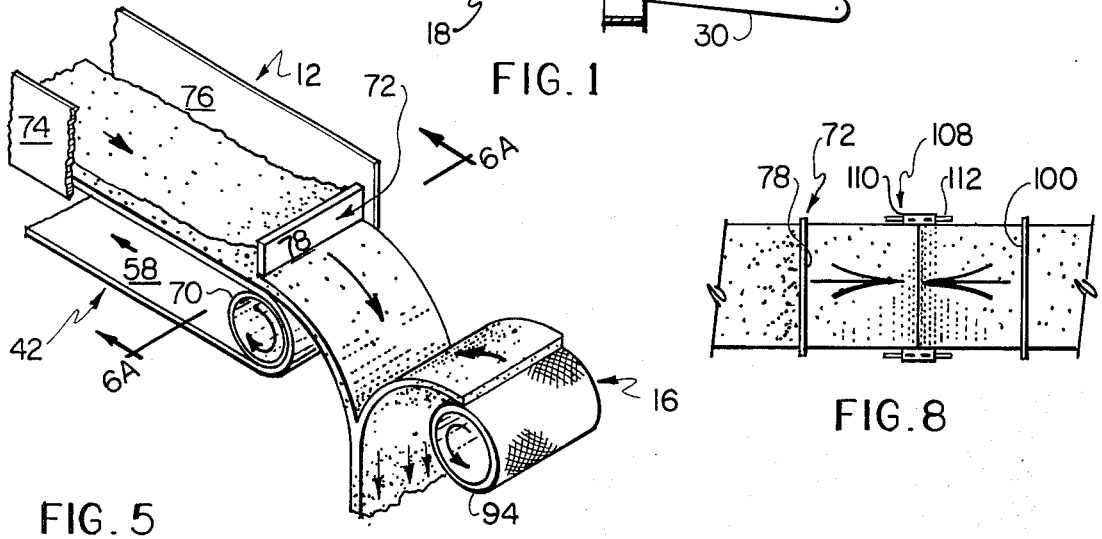
FIG. 5
FIG. 8
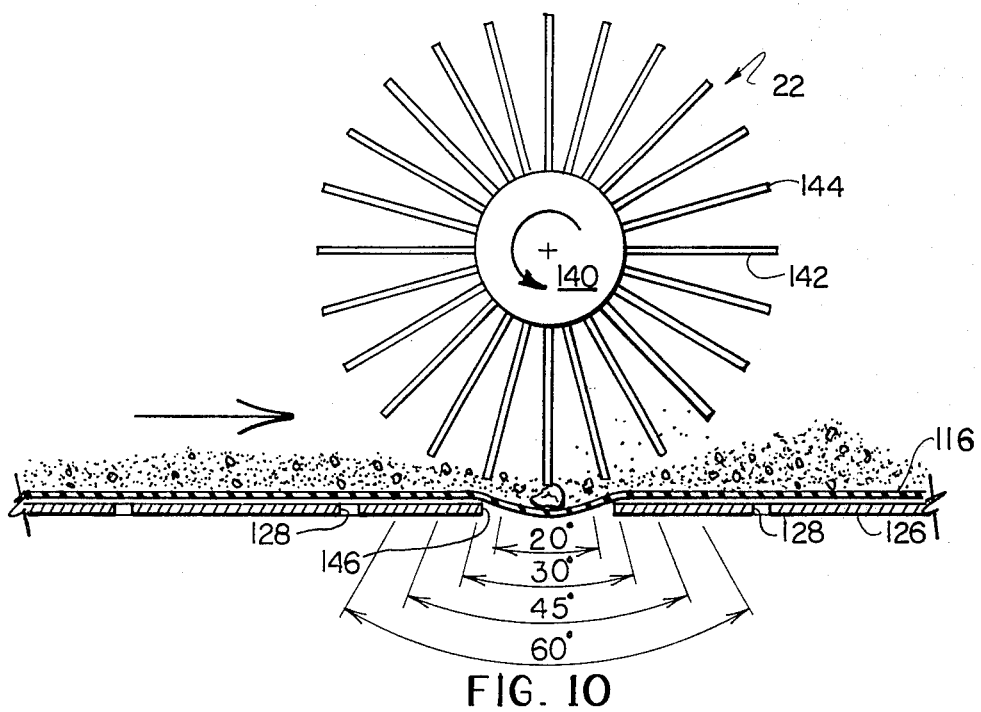
FIG. 10

TECHNIQUE FOR MIXING GRANULAR MATERIALS

The concrete mixing devices which are presently in wide use basically comprise a pug mill into which cement, sand, gravel and water are metered in a batch operation. After the appropriate amount of the separate materials are placed in the mill, the mill is turned on to mix the materials together. The mixing operation in the mill is quite inefficient since the materials are effectively ground against the sides of the mill receptacle. Accordingly, an inordinate amount of energy is consumed in the mixing operation, the mill paddles or mixing elements wear quite rapidly and the mixing operation takes a substantial amount of time.

Because of the inherent undesirable features of batch type concrete mixing devices incorporating pug mills or the like, there have been suggested in the prior art a number of continuously operating concrete mixing devices. By and large, these devices have achieved limited or sporadic use, if any, in the industry. Typical disclosures are found in U.S. Pat. Nos. 1,332,938; 2,264,170; 2,610,373; 3,107,901 and 3,306,589. One important requirement of concrete mixing devices is that the mixed concrete should be of substantially uniform and predetermined composition. In other words, a concrete mixing device which produces cement-rich streaks or which produces sand or gravel-rich streak is obvious undesirable. For most purposes, the creation of streaks or sections which are rich in one or the other of the concrete components renders the mixing device wholly unacceptable.

The device of this invention is a continuously operable mixing apparatus which produces a mixed material of substantially uniform and predetermined composition. One device has been built and tested in accordance with the principles of this invention. It was desired to mix an extremely stiff concrete for a pipecoating operation. The device was designed to produce 10,000 pounds of concrete per minute. Since the concrete was designed for a pipe-coating operation, approximately 15% of pea gravel was incorporated in the concrete. In one test run, operating at about 60% of design speed, approximately 18,000 pounds of concrete was applied to a joint of 36 inch diameter pipe in about three minutes using known concrete application techniques. The concrete coating was uniform and free of either concrete-rich streaks or sand-rich streaks. In another test run, operating at about 60% of design speed for about 15 seconds and without adding either water or gravel, a sizeable mound of mixed cement and sand was delivered at the output end of the device. Digging through the mound revealed that the mixed material was free from discernible sand-rich or cement-rich streaks.

Other disclosures of interest with respect to this invention are found in U.S. Pat. Nos. 2,267,677 and 3,688,894.

It is an object of this invention to provide a continuously operable technique for mixing granular materials at relatively rapid rates to produce a mixture of substantially uniform composition.

In summary, one aspect of this invention is to provide a device for homogenously mixing first and second granular materials comprising a conveyor; means for discharging the first and second materials in first and second laterally aligned, equal width falling paths toward the conveyor and for shaping the paths in complementary predetermined cross-sectional shapes providing a substantially constant proportion of the first and second materials at all locations across the path widths; and means for mixing the first and second materials at a location above the conveyor during falling movement thereof toward the conveyor.

In summary, another aspect of this invention comprises a method of homogenously mixing first and second granular materials including the steps of delivering the first material in a first gravity influenced falling path of predetermined cross-sectional shape and predetermined width from a first location toward a support; delivering the second material in a second gravity influenced falling path of predetermined cross-sectional shape and the same predetermined width as the first path from a second location toward the support, the first and second paths being juxtaposed intermediate the locations and the support and being laterally aligned, the predetermined cross-sectional shapes of the first and second paths providing a substantially constant proportion of the first and second materials along the path widths; and intermingling the first and second materials at the juxtaposition of the paths at a third location above the support during falling movement of the material.

IN THE DRAWINGS:

FIG. 1 is a schematic view of a mixing device in accordance with the principles of this invention;

FIG. 5 is an isometric view of the materials flowing out of metering devices in preparation for mixing;

FIG. 8 is a top view of FIG. 5;

FIG. 10 is an enlarged cross-sectional view of the main conveyor taken substantially along the line 10—10 in FIG. 9.

Figure 2:
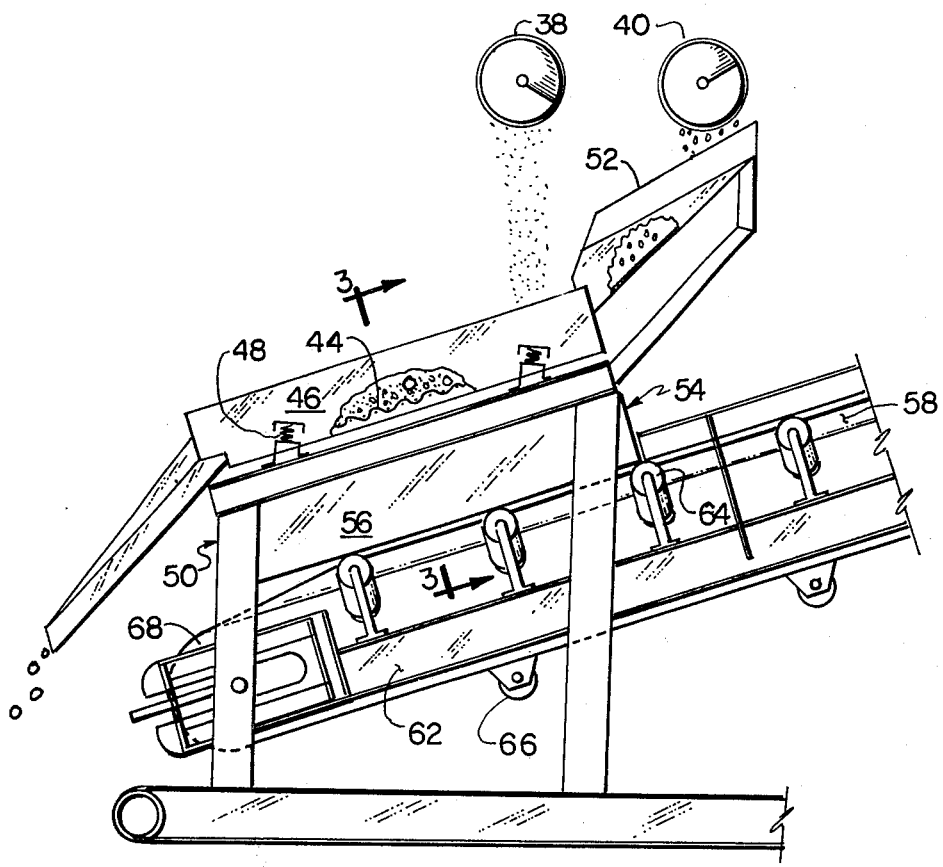
FIG. 2 is an enlarged view of the input end of an aggregate conveyor used in the device of FIG. 1.

Referring to FIG. 1, there is illustrated a device 10 designed in accordance with the principles of this invention for mixing concrete. The mixing device 10 comprises, as major components, means 12 for delivering aggregate to a blender 14, means 16 for delivering cement to the blender 14, a conveyor 18 for receiving mixed materials from the blender 14 and transporting the same to a discharge or output 20 and a plurality of mixing or agitating devices 22 spaced along the direction of travel of the conveyor 18. As shown in FIG. 2, there is provided a water discharge line 24 for adding water to the mixture since it is normally desired to produce a wet mix as opposed to a dry mix.

Also illustrated in FIG. 1 are certain components which suggest that the mixing device 10 is being used to deliver concrete to a pipe-coating operation. To this end, there is provided a concrete applicator 26 which receives mixed concrete from the discharge end 20 of the conveyor 18 and accelerates the same against a joint of pipe located in the path of travel 28 of the applicator 26, in accordance with known techniques. There is also illustrated a reclaim conveyor 30 which receives surplus concrete from the applicator 26 and delivers it to the lower end of a concrete elevator 32 for discharge onto the main conveyor 18. The elevator 32 is of conventional design and may comprise a large rotatable wheel having buckets therein for receiving concrete from the reclaim conveyor 30. Rotation of the elevator wheel elevates the filled buckets to a position above the main conveyor 18 whereupon the concrete falls onto the conveyor 18. It will be apparent that the concrete applicator 26 and reclaim system 30, 32 are peculiar to pipecoating operations and are not required in other concrete mixing situations.

Figure 3:
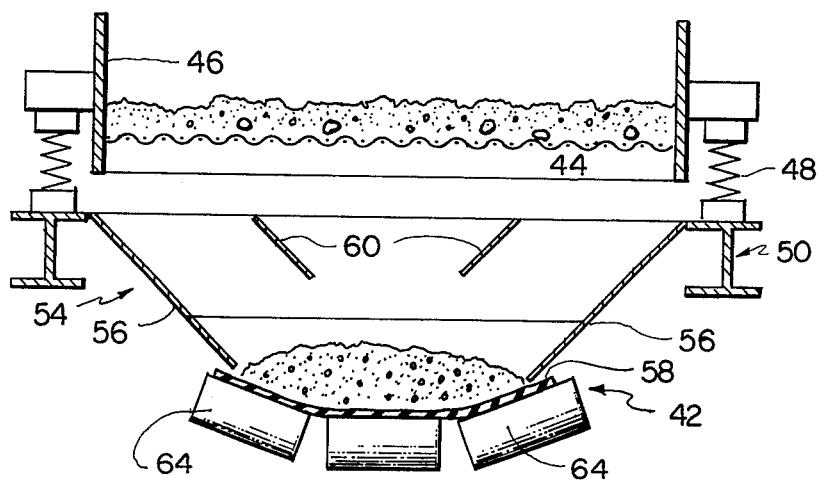
FIG. 3 is a cross-sectional view of the aggregate conveyor of FIG. 2, taken substantially along line 3—3 thereof as viewed in the direction indicated by the arrows.

Referring to FIGS. 1–3, the aggregate delivery means 12 comprises a pair of hoppers 34, 36 which may be filled respectively with sand and gravel size aggregate or, in situations where only a sand-cement mixture is desired, may both be filled with sand. Suitable conveyors, 38, 40, such as augers, are provided to deliver granular materials in the hoppers 34, 36 respectively toward the inlet end of an aggregate conveyor 42.

As shown best in FIGS. 2 and 3, the conveyor 38 discharges directly toward a vibrating shaker screen 44 supported by a suitable frame 46. The shaker frame 46 is resiliently supported by suitable springs 48 from a stationary framework 50. The shaker frame 46 is vibrated in any suitable manner.

The conveyor 40 is positioned to discharge into a chute 52 which acts to direct material discharging from the conveyor 40 toward the shaker screen 44 at the intersection of the material discharging from the conveyor 38. The shaker screen 44 may be of any desirable mesh to reject oversize particles. Since the material flow paths from the conveyor 38 and the chute 52 are directed toward each other, there is a substantial amount of mixing of the sand and gravel. It will be apparent that the conveyors 38, 40 may be driven at predetermined speeds in order to proportion the granular material delivered thereby. Even though augers are not precise metering devices, they will act to proportion sand and gravel within acceptable limits.

As shown best in FIG. 3, a funnel arrangement 54 is disposed between the shaker screen 44 and the aggregate conveyor 42. The funnel arrangement 54 comprises a pair of outer funnel plates 56 which act to direct the discharge from the shaker screen 44 to an endless belt 58 of the conveyor 42. It will be apparent that the outer funnel plates 56 would tend to concentrate granular material along the outer edges of the belt 58. To avoid this tendency and to promote a relatively even deposition of granular material on the belt 58, there is provided a pair of inner funnel plates 60. It will accordingly be apparent that the discharge from the relatively wide shaker screen 44 is concentrated in a relatively uniform fashion on the narrower belt 58.

The aggregate conveyor 42 may be of any desirable type and is illustrated as comprising the endless belt 58, a conveyor frame 62 which support a plurality of upper troughing rollers 64 and a plurality of return rollers 66, a large drum 68 at the inlet end of the conveyor 42 and a large drum 70 at the discharge end of the conveyor 42. The belt 58 may be driven in any suitable fashion, as by providing a motor (not shown) in driving relation with the drum 70.

Positioned adjacent the discharge end of the aggregate conveyor 42 and comprising part of the blender 14 is a device 72 for volumetrically metering the discharged aggregate and for distributing the discharged aggregate in a precise predetermined cross-sectional shape. As will be more fully apparent hereinafter, it is essential in the continuous high rate production of uniform consistency that the delivery of aggregate and cement to the blender 14 be in material paths having a correlated quantity of aggregate and cement throughout each incremental unit of path width. The simplest and most convenient technique for correlating the quantity of cement and aggregate throughout each incremental unit of path width is to shape the discharging material into paths of rectangular cross-section and equal width so that each path provides a substantially constant quantity of its material per linear unit of path width. The thickness of the rectangular material path is accordingly proportional to the quantity of material delivered. Accordingly, the thicknesses of the aggregate path is selected to deliver the proper quantity of aggregate at a predetermined speed of the belt 58.

Figure 6A:
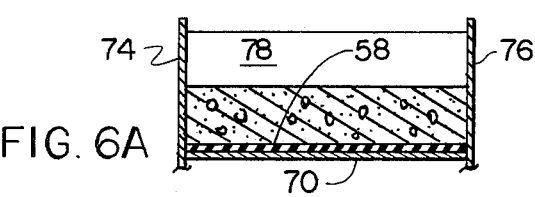
FIG. 6A is a cross-sectional view of the aggregate metering device, taken substantially along line 6A—6A of FIG. 5 as viewed in the direction indicated by the arrows.

To this end, the metering device 72 includes a pair of substantially vertical side plates 74, 76 which laterally constrain aggregate on the belt 58 and a strike-off blade 78 defining the thickness of the discharged material path, as shown in FIG. 5. The strike-off blade 78 is desirably adjustably mounted to vary the thickness of the discharged material path as may be seen by a comparison of FIGS. 5 and 6a. It will be apparent that the conveyor belt 58 defines the bottom of the material path. Since the belt 58 is somewhat flexible, its shape is determined by the external configuration of the drum 70 which is conveniently substantially cylindrical. It will accordingly be seen that the material paths defined by the apparatus illustrated in FIGS. 5 and 6a is rectangular in cross-section providing a substantially constant quantity of aggregate per linear unit of path width.

Figure 6B:
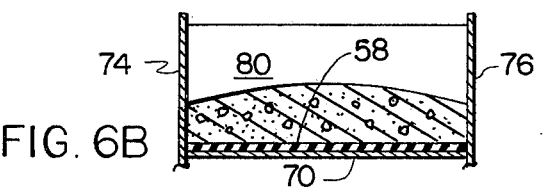
FIGS. 6B and 6C are views similar to FIG. 6A illustrating other embodiments of the invention.

Referring to FIG. 6b, there is illustrated a strike-off blade 80 having an operative surface of different configuration to produce an aggregate material path of other than rectangular cross-section. In the embodiment of FIG. 6b, the quantity of aggregate per linear unit of path width is not constant but instead decreases toward the edge of the conveyor belt 58. As mentioned previously, the quantity of aggregate and cement must be correlated throughout each incremental unit of path width. Accordingly, when using an aggregate strike-off blade such as shown in FIG. 6b, one must provide a cement path of complementary configuration to assure that the proportion of cement and aggregate remains substantially constant for each incremental unit of path width.

Figure 6C:
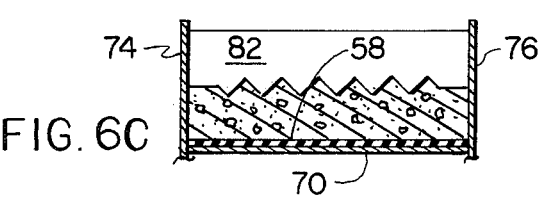

Referring to FIG. 6c, there is illustrated a strike-off blade 82 of sawtooth configuration to provide an aggregate path which varies in thickness across the width thereof. As will be more fully pointed out hereinafter, the corresponding device in the cement delivery means 16 must be configured to deliver a cement path of complementary configuration.

Figure 4:
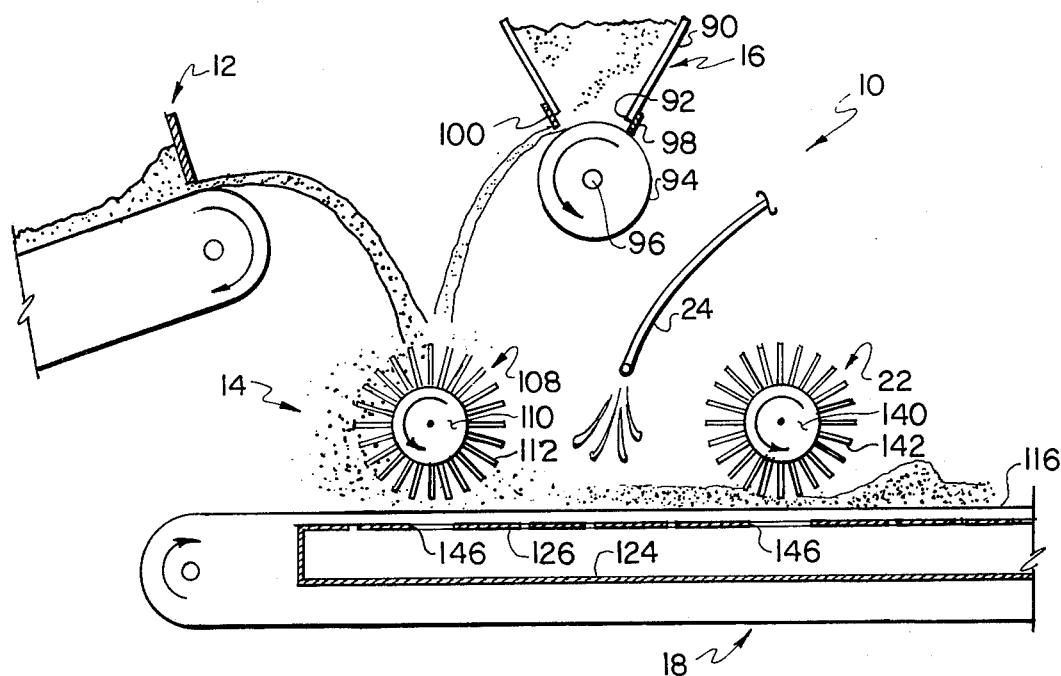
FIG. 4 is a more detailed, but still partially schematic, view of part of the mixing device of FIG. 1.

The cement delivery means 16 conveniently comprises a hopper 84 for gravitationally feeding cement to a conveyor 86, such as an auger or the like, which is positioned to deliver cement into a device 88 comprising part of the blender 14 for volumetrically metering the discharged cement and for shaping the discharged cement in a precise predetermined cross-sectional shape. The device 88 includes a hopper 90 having a discharge end 92 closely adjacent a knurled roller 94 mounted for rotation on an axle 96 driven by a suitable motor (not shown). As shown in FIG. 4, the roller 94 is driven in a counterclockwise direction to deliver a path of cement in a free fall direction toward the aggregate path. A strike-off blade 100 is adjustably positioned on the hopper 90 to vary the thickness of the cement path.

Figure 7A:
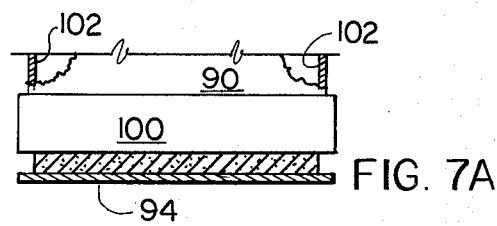
FIG. 7A is a cross-sectional view of the cement metering device, taken substantially along line 7A—7A of FIG. 1, as viewed in the direction indicated by the arrows.

As shown best in FIGS. 5 and 7a, the cement path emitting from the metering device 88 is substantially rectangular in cross section thereby providing a substantially constant quantity of cement per unit length of path width. Accordingly, the proportion of cement and aggregate emitting from the metering device 88, 72, respectively remain substantially constant throughout the width of the cement and aggregate paths so long as the belt 58 and roller 94 are driven at constant rates. It will be apparent from FIG. 7a that the width of the cement path is determined by the spacing between the inner surfaces of the walls 102 of the hopper 90. As may be seen best in FIG. 8, the cement and aggregate paths are of the same width and are laterally aligned in the sense that the sides of the cement and aggregate paths reside in common planes.

Figure 7B:
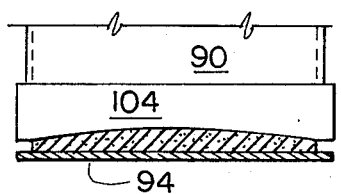
FIGS. 7B and 7C are views similar to FIG. 7A illustrating other embodiments of the invention.

Referring to FIG. 7b, there is illustrated a strike-off blade 104 for the cement metering device 88 which produces a cement path complementary to the aggregate path produced by the device of FIG. 6b. It will be apparent that the operative surfaces of the strike-off blade 80, 104 may be configured to produce a constant proportion of cement and aggregate throughout the path width.

Figure 7C:
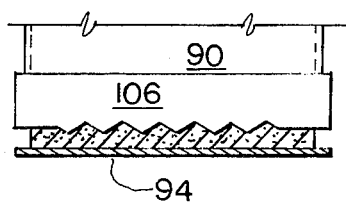

Referring to FIG. 7c, there is illustrated a strike-off blade 106 of generally saw-tooth configuration to produce a cement path complementary to the aggregate path produced by the device of FIG. 6c. It will be apparent that the proportion of aggregate and cement remains substantially the same throughout the path widths.

In the metering devices of FIGS. 6b, 7b and 6c, 7c, it is apparent that the quantity of aggregate and cement varies along the width of the respective paths. It is also apparent that the proportion of cement and aggregate remains substantially constant. Accordingly, the quantities of aggregate and cement vary at the same rate along the respective path widths.

As shown best in FIG. 4, the aggregate and cement paths are desirably basically free fall and converge toward a dispersing device 108 comprising part of the blender 14. The device 108 includes a rotatably driven drum 110 having a multiplicity of prongs or spikes 112 thereon.

It is desirable that the cement and aggregate paths be slightly narrower than the operative width of the concrete conveyor 18. The dispersing device 108 preferably spans the operative width of the conveyor 18. As shown best in FIG. 8, the aggregate and cement paths fall onto the dispersing device 108. Rotation of the device 108 in the direction shown by the arrow in FIG. 4 causes the prongs 112 to pass through the aggregate and cement and propel most of the granular particles to the left. The mixed aggregate and cement particles then fall onto the concrete conveyor 18. In the model of the device built in accordance with this invention, it is estimated that the aggregate and cement is about 90–95 percent mixed by the time it reaches the conveyor belt 18.

Figure 9:
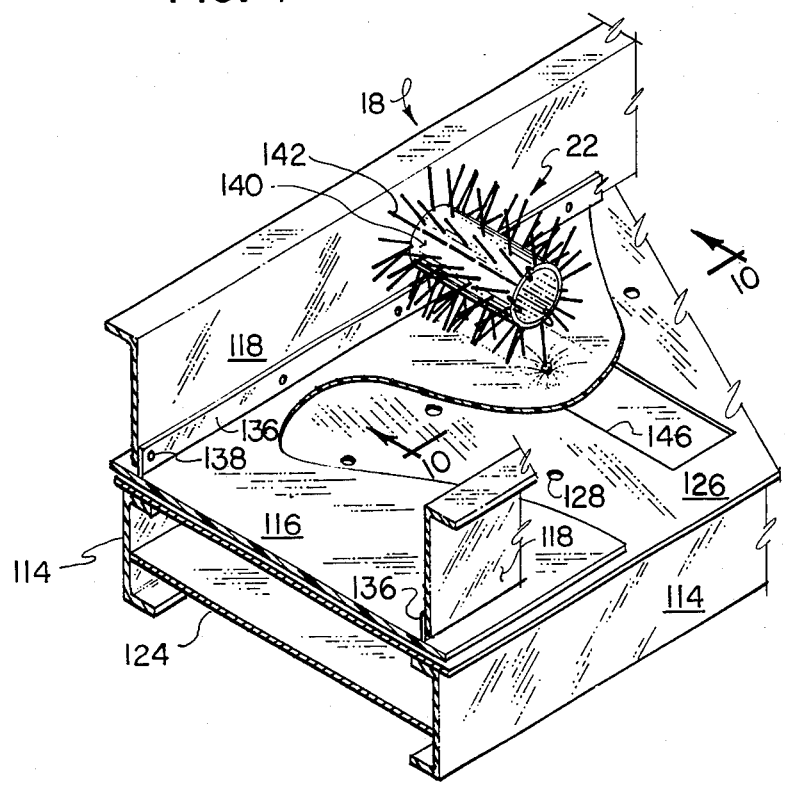
FIG. 9 is an isometric view, partly broken away, illustrating the main conveyor of this invention.
Figure 11:
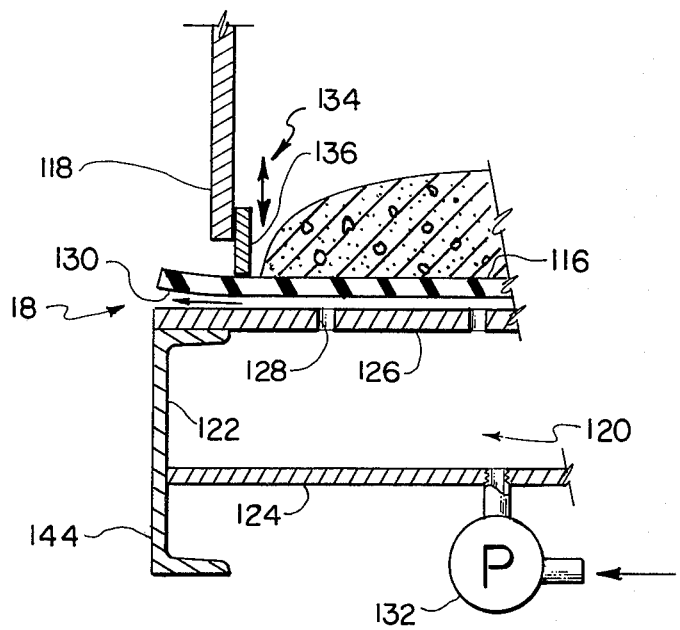
FIG. 11 is an enlarged view illustrating certain details of the main conveyor.

As shown best in FIGS. 9–11, the conveyor 18 includes a pair of channels 114 comprising a conveyor frame, an endless conveyor belt 116, a pair of side walls 118 for laterally constraining material on the belt 116 and an air suspension system 120 for supporting the conveyor belt 116. As shown best in FIGS. 9 and 11, the side walls 118 are spaced from the edges of the belt 116 for purposes more fully explained hereinafter.

The air suspension system 120 comprises an air reservoir 122 defined by the channels 114, a lower plate 124 and an upper plate 126. The plate 126 immediately underlies the conveyor belt 116 and provides a plurality of air escape passages 128 from the reservoir 122 to the underside of the conveyor belt 116. As air pressure builds up in the reservoir 122, the conveyor belt 116 is vertically lifted thereby allowing air to escape laterally of the conveyor 18 through a gap 130 as suggested by the arrow in FIG. 11. A suitable air compressor 132 is provided to pressurize the reservoir 122.

An important feature of the air suspension system 120 is means 134 for adjusting the size of the gap 130 and preventing material loss under the side walls 118. The gap adjusting means 134 comprises a pair of elongate wear strips 136 adjustably and removably secured to the side walls 118, in any suitable fashion, as by counter-sunk screws operating in suitable slots in either the wear strips 136 or the side walls 118. In addition to adjusting the size of the gap 130 and preventing material loss under the side wall 118, the wear strips 136 also take all of the frictional engagement against the belt 116. Accordingly, the strips 136 undergo abrasion and need to be replaced periodically rather than the side walls 118. It will be apparent that the frictional wear between the strips 136 and the belt will be quite minor if the strips 136 are correctly adjusted.

In the event the wear strips 136 are too close to the upper perforate plate 126, the gap 130 will be too small. The central part of the loaded belt 116 may rub against the upper plate 126 during belt movement. In this circumstance, it will be apparent that unnecessary frictional forces are generated during operation of the mixing device 10 which would have to be overcome by the application of unnecessary energy. In addition, the strips 136 will wear excessively.

In the event the wear strips 136 are too far from the plate 126, the gap 130 becomes relatively large thereby allowing an unnecessarily large amount of air to escape from the reservoir 122 which would require that the compressor 132 be unnecessarily oversized. If the wear strips 136 were elevated substantially above the perforate plate 126, the belt 116 would not come into sealing contact with the strips 136 thereby allowing mixed concrete on the belt 116 to escape laterally under the side wall 118 and be wasted.

In operation, substantially the entire width of the belt 116 between the wear strips 136 is loaded with concrete. As suggested in FIG. 11, the belt 116 tends to sag somewhat in the center and provides slightly elevated edges.

The mixing or agitating devices 22 may be substantially identical to the dispersing device 108 although they operate in a significantly different fashion. Accordingly, the mixing devices 22 may comprise a drum or mandrel 140 having a plurality of spikes or prongs 142 thereon. The drums 140 are driven in a counterclockwise direction as suggested in FIGS. 4 and 10. The mixing devices 122 are positioned above the conveyor belt 116 so that the prongs 142 extend into the concrete traveling along the belt 116 as suggested in FIGS. 4 and 10. The drums 140 are driven at a rate such that the peripheral speed of the spikes or prongs 142 is in excess of the rate of travel of the belt 116. Concrete traveling along the belt 116, at a position immediately downstream of each of the mixing devices 22, is thrown off of the belt 116 and then falls by gravity back onto the belt 116. The appearance of the concrete immediately downstream of each of the mixing devices 22 is somewhat similar to the wake produced by an outboard motor as the boat initially gets underway.

As previously mentioned, the dry aggregate and cement is substantially completely mixed before it reaches the first of the mixing devices 22. If one were producing a pre-mix concrete, the minimum number of mixing devices 22 would be substantially decreased. In the more common situation where water is being mixed with aggregate and cement, as through the waterline 24, the main function of the mixing devices 22 is to assure dispersal of the water throughout the aggregate-cement mixture.

As suggested previously, the mixing devices 22 are positioned relative to the conveyor belt 116 so that the prongs 142 extend into the concrete path. Obviously, the prongs 142 are not so long that they engage the belt 116. Preferably, the terminal ends 144 of the prongs 142 are spaced from the conveyor belt 116, at the closest approach thereof, a distance slightly exceeding the largest sized aggregate which will pass through the shaker screen 44. Although this theoretically should prevent unnecessary damage to the conveyor belt 116, larger particles will inevitably either get into the concrete mixture or particles will agglomerate and become wedged between the prongs 142 and the belt 116 as illustrated in FIG. 10. In order to prevent damage to the belt 116, the upper plate 126 provides an enlarged opening 146 immediately beneath each of the mixing devices 122 and the dispersing device 108. The opening 146 extends substantially the entire distance beneath the wear strips 136. The opening 146 conceivably could extend in the direction of belt travel for a substantial distance, for example, through a 60° arc defined by the center of rotation of the drum 140 as suggested in FIG. 10. An opening of this size has a substantial disadvantage since the flexible belt 116 tends to sag in the center of the opening so that the prongs 142 do not penetrate and scatter the concrete to the same extent as with a smaller opening. The rate of approach of the prong ends 144 to the belt 116 suggests that the opening 146 may be substantially smaller, for example, on the order of 20°–45°. A suitable compromise between belt protection and scattering efficiency is achieved when the opening 146 extends through an arc of about 30° defined by the center of rotation of the drum 140.

In operation, aggregate is fed through the conveyors 38, 40 and cement is fed through the conveyor 86 at rates which will achieve an average desired proportion between the various granular components. The metering devices 72, 88 afford an instantaneous regulation of the granular material flow rate and discharge the granular materials in paths of precise predetermined cross section.

The quantity of aggregate discharging from the aggregate conveyor 42 is, of course, the product of the speed of the belt 58 and the cross sectional area under the strike off blade 78. Similarly, the quantity of cement discharged from the metering device 88 is the product of the tangential velocity of the roller 94 and the area under the strike off blade 100. The volumetric proportions of aggregate and cement may be varied by changing the rate of travel of the belt 58 or the roller 94 or changing the area under the strike off blades 78, 100.

The granular materials emitting from the metering devices 72, 88 fall in an inclined gravity influenced path toward the dispersing device 108. As the materials fall into contact with the rotating prongs 112, there is created a cloud of mixed particles which ultimately gravitate onto the moving conveyor belt 116 as suggested in FIG. 4. To prevent escape of scattered materials in the blender 14, there is preferably provided a hood or shield (not shown) enclosing the metering device 78, the lower end of the metering device 88, and the dispersing device 108. Water may conveniently be added to the mixture immediately downstream of the dispersing device 108 and thoroughly worked into the mixture by the mixing devices 22. The concrete discharging from the main conveyor 18 may be used for any desirable purpose.

The mixing device 10 of this invention provides numerous and substantial advantages over prior art techniques. First, the device 10 is capable of continuous high rate production of streak free mixtures. Second, the energy consumed in the operation of the device 10 is surprisingly small. In a device designed to deliver 10,000 pounds of mixed concrete per minute, less than about 50 horsepower is required to drive the actual mixing components. A substantial energy savings occurs in the blender 14 and in the air supported conveyor 18. As compared to a conventional pug-mill mixer, essentially the same amount of energy will be required to transport the various materials to the area where mixing will occur. Accordingly, the energy consumed in the augers 38, 40, 86 and by the conveyor 42 will be substantially the same as the comparable components in a conventional pug-mill mixer. The energy required, however, to drive the knurled roller 94, the dispersing device 108, the conveyor 18 and the various mixing devices 22 will be substantially less than is required to drive the actual mixing components of a conventional pug-mill mixer. In the model of the device constructed, the horsepower required to drive the roller 94, the dispersing device 108, the conveyor 118 and the mixing devices 22 is on the order of about 36 horsepower at full capacity. The horsepower required on a conventional pug-mill mixer of comparable capacity for the comparable functions is on the order of about 120 horsepower since devices of this type mix the materials by grinding them against the mill receptacle.

Third, the device is relatively easy to clean, as at the end of a working day or temporary suspension of operations. All that is required is to stop the conveyors 38, 40, 86 while continuing to deliver water through the line 24. Except for concrete adhering to the prongs 142 of the mixing devices 22, the device is substantially self-cleaning. Concrete adhering to the prongs 142 need not be removed upon each stoppage of the device 10. It is presently believed that weekly removal of concrete from the prongs 142, as by striking them with a hammer, will suffice. In fact, this is a mixed blessing. The mixing elements in conventional pug-mill mixers wear out rapidly since they basically grind the granular materials against a receptacle. There is some degree of abrasive wear on the prongs 142 since they pass through the wet concrete mixture thereunder. It will be apparent, however, that a small build-up of hardened concrete on the prongs 142 prevents abrasive wear on the prongs. It is presently believed that the prongs should be cleaned on the order of about once a week. Since a small build-up will occur after a few hours operation, it is apparent that the prongs 142 will suffer abrasive wear for only the first few hours after they have been cleaned. Accordingly, the prongs 142 should last a substantial length of time before retipping would be required.

Another advantage of the mixing device 10 is that it is substantially quieter than conventional pug-mill mixers of half the capacity. Another advantage of this invention is that no brake is required on the conveyor 18, mixing device 22 or dispersing device 108 if hydraulic motors are used to drive the same. When the power fluid to the motor is turned off, the motor is liquid-locked and comes to an immediate halt rather than coasting.

I claim;

1. A device for homogeneously mixing first and second granular materials comprising
    a first conveyor for receiving and conveying a mixture of the first and second materials;
    second and third conveyors for separately feeding the first and second materials;
    means for peripherally confining the first and second materials on the second and third conveyors respectively into first and second streams of equal width and complimentary predetermined cross-sectional shapes providing a substantially constant proportion of the first and second materials at all locations across the stream widths;
    the second and third conveyors being positioned for laterally aligning and delivering the streams in juxtaposed gravity influenced paths toward the first conveyor; and
    means for mixing the first and second materials at a location above the first conveyor during falling movement thereof toward the conveyor.

2. The device of claim 1 wherein the sides of the first and second paths define common planes.

3. The device of claim 2 wherein the paths converge from horizontally spaced locations toward the mixing means.

4. The device of claim 1 wherein the conveyor comprises an endless conveyor of predetermined width and means for advancing the conveyor in a direction of travel, and the mixing means includes a rotatable element in the first and second paths having a plurality of projections thereon, an axis of rotation extending transverse to the width of the conveyor and means for rotating the element.

5. The device of claim 4 wherein the conveyor width exceeds the path widths.

6. The device of claim 1 wherein the first and second paths provide first and second substantially constant quantities of the first and second materials per linear unit of path width.

7. The device of claim 6 wherein the first and second paths are of substantially rectangular cross section.

8. The device of claim 1 wherein the paths comprise substantially parallel segments extending from a second location above the mixing means toward the first mentioned location.

9. A device for homogenously mixing first and second granular materials comprising
    a conveyor;
    means for shaping the first and second materials in first and second laterally aligned, equal width streams of complimentary predetermined cross-sectional shapes wherein the first and second streams provide first and second varying quantities of the first and second materials per linear unit across the stream width and the first and second varying quantities vary at the same rate providing a substantially constant proportion of the first and second materials at all locations across the stream widths and for delivering the streams in juxtaposed gravity influenced paths toward the conveyor; and
    means for mixing the first and second materials at a location above the conveyor during falling movement thereof toward the conveyor.

10. The device of claim 9 wherein the first and second paths include at least one arcuate surface.

11. The device of claim 9 wherein the first and second paths include at least one saw-tooth shaped surface.

12. A device for homogeneously mixing first and second granular materials comprising
    a conveyor including a conveyor frame, an endless belt of predetermined width looped about the frame, means for advancing the belt in a direction of travel, sidewalls disposed above the conveyor frame parallel to the direction of travel and spaced closer than the width of the conveyor belt, an air suspension system for raising the belt relative to the conveyor frame including an elongate air outlet gap between the belt and the conveyor frame laterally of the side walls and a wear strip on at least one of the side walls between the one side wall and the center line of the conveyor and extending in the direction of travel, and means for adjusting the position of the wear strip toward and away from the belt;
    means for shaping the first and second materials in first and second laterally aligned, equal width streams of complimentary predetermined cross-sectional shapes providing a substantially constant proportion of the first and second materials at all locations across the stream widths and for delivering the streams in juxtaposed gravity influenced paths toward the conveyors; and
    means for mixing the first and second materials at a location above the conveyor during falling movement thereof toward the conveyor.

13. A device for homogenously mixing first and second granular materials comprising
    a conveyor including a flexible conveyor belt and means for driving the belt along a direction of travel;
    means for shaping the first and second materials in first and second laterally aligned, equal width streams of complimentary predetermined cross-sectional shapes providing a substantially constant proportion of the first and second materials at all locations across the stream widths and for delivering the streams in juxtaposed gravity influenced paths toward the conveyor;

means for mixing the first and second materials at a location above the conveyor during falling movement thereof toward the conveyor; and a mixing device spaced along the conveyor downstream of the mixing means and including an element above the flexible conveyor belt having a plurality of projections thereon spaced from the conveyor belt at the closest approach therebetween, and means for rotating the element about an axis transverse to the conveyor, and wherein the conveyor includes a planar element underneath and juxtaposed to the belt and extending therebeside along the direction of travel on either side of the mixing device, the planar element providing an enlarged depression under the mixing extending on both sides of the axis of element rotation.

14. The device of claim 13 wherein the depression extends in the direction of travel for a distance equivalent to the intersection of the planar element and an arc of 20°–45° having a center on the element axis.

15. The device of claim 14 wherein a vertical plane passing through the element axis substantially bisects the depression.

16. The device of claim 15 wherein the distance is equivalent to an arc of about 30°.

17. A method of homogenously mixing first and second granular materials comprising the steps of shaping the first material in a first stream of predetermined cross-sectional shape and predetermined width;

delivering the first stream in a first gravity influenced falling path from a first location toward a support;

shaping the second material in a second stream of predetermined cross-sectional width and the same predetermined width as the first stream;

delivering the second stream in a second gravity influenced falling path from a second location toward the support, the first and second paths being juxtaposed intermediate the locations and the support and being laterally aligned, the predetermined cross-sectional shapes of the first and second streams providing a substantially constant proportion of the first and second materials along the path widths; and intermingling the first and second materials at a third location above the support during falling movement of the material.

18. The method of claim 17 wherein the second delivering step includes propelling the second material from the second location into an inclined falling path, the first and second paths converging in the direction of the support and the intermingling step includes passing a multiplicity of elements through the first and second paths at a location adjacent the convergence thereof in a direction substantially perpendicular to the paths.

19. A device for mixing first and second granular materials comprising means for discharging the first and second materials in a path;

a conveyor in the path for receiving and transporting the granular materials including an endless belt and means for driving the belt;

a plate beneath the belt and juxtaposed thereto along the upper belt run in the direction of travel; and a mixing device above the belt including an element having a plurality of projections thereon extending away from the element toward the belt; and means for rotating the element about an axis transverse of the belt;

the plate providing an enlarged depression under the mixing device extending on both sides of the axis of element rotation.

20. The device of claim 19 wherein the depression extends in the direction of travel for a distance equivalent to the intersection of the plate and an arc of 20°–45° having a center on the element axis.

21. The device of claim 20 wherein a vertical plane passing through the element axis substantially bisects the depression.

22. The device of claim 21 wherein the distance is equivalent to an arc of about 30°.

23. A device for homogenously mixing first and second granular materials comprising a conveyor;

means for shaping the first and second materials in first and second laterally aligned, equal width streams of complimentary predetermined cross-sectional shapes providing a substantially constant proportion of the first and second materials at all locations across the streams widths and for delivering the streams in juxtaposed gravity influenced paths comprising substantially parallel path segments extending from a first location downwardly toward a second location; and means for mixing the first and second materials at the second location above the conveyor during falling movement thereof toward the conveyor, the mixing means including a rotatable element having an axis of rotation extending transverse to the conveyor and means for rotating the element.

24. The device of claim 23 further comprising at least one additional mixer disposed transversely across the conveyor and closely spaced therefrom past which the granular materials are conveyed by the conveyor.

25. A method of homogenously mixing first and second granular materials comprising the steps of delivering the first material in a first gravity influenced falling path of predetermined cross-sectional shape and predetermined width from a first location toward a support;

delivering the second material in a second gravity influenced falling path of predetermined cross-sectional shape and the same predetermined width as the first path from a second location toward the support, the first and second paths being juxtaposed at a third location intermediate the first and second locations and the support having substantially parallel segments extending from the third location downwardly toward a fourth mixing location and being laterally aligned, the predetermined cross-sectional shapes of the first and second paths providing a substantially constant proportion of the first and second materials along the path widths; and intermingling the first and second materials at the fourth location above the support during falling movement of the material.

26. A method of mixing first and second granular materials comprising
   shaping the first material into a stream of predetermined cross-sectional shape and predetermined width;
   shaping a second material into a stream of predetermined cross-sectional shape and the same predetermined width as the first stream;
   delivering the first and second streams in gravity influenced paths toward a first rotary mixer above a conveyor;
   rotating the first rotary mixer in the paths and intermingling the materials above the support;
   conveying the materials by the conveyor from the first rotary mixer to at least one additional rotary mixer; and
   rotating the additional rotary mixer into the materials about an axis above and transverse to the conveyor for further mixing the materials.

27. The method of claim 26 wherein the paths comprise parallel segments extending from a location above the first mixer toward the first mixer.

28. The method of claim 27 wherein the first mentioned rotating step comprises rotating the first rotary mixer about an axis transverse to the conveyor, the path segments being substantially perpendicular to the conveyor.

29. A device for homogenously mixing first and second grandular materials comprising
   a conveyor;
   means for feeding the first and second materials through separate flow-confining shaping means in first and second laterally aligned, equal width, streams of complimentary predetermined cross-sectional shapes providing a substantially constant proportion of the first and second materials at all locations across the stream widths and for delivering the streams in juxtaposed gravity influenced paths toward the conveyor; and
   means for mixing the first and second materials at a location above the conveyor during falling movement thereof toward the conveyor.

* * * * *

UNITED STATES PATENT OFFICE
CERTIFICATE OF CORRECTION

Patent No. 3,942,772            Dated March 9, 1976

Inventor(s) Carl K. Smith

It is certified that error appears in the above-identified patent and that said Letters Patent are hereby corrected as shown below:

Column 3, line 31 delete "," before "38";

Column 4, line 17 after "consistency" add --concrete--;

Column 11, line 19 after "mixing" add --device--;

Column 11, line 38 change "width" to --shape--; and

Column 14, line 7 change "grandular" to --granular--.

Signed and Sealed this

Third Day of August 1976

[SEAL]

Attest:

RUTH C. MASON  
Attesting Officer

C. MARSHALL DANN  
Commissioner of Patents and Trademarks